April 14, 1925.
R. DYMOCK
INTERNAL BRAKE
Filed Feb. 20, 1922
1,533,790
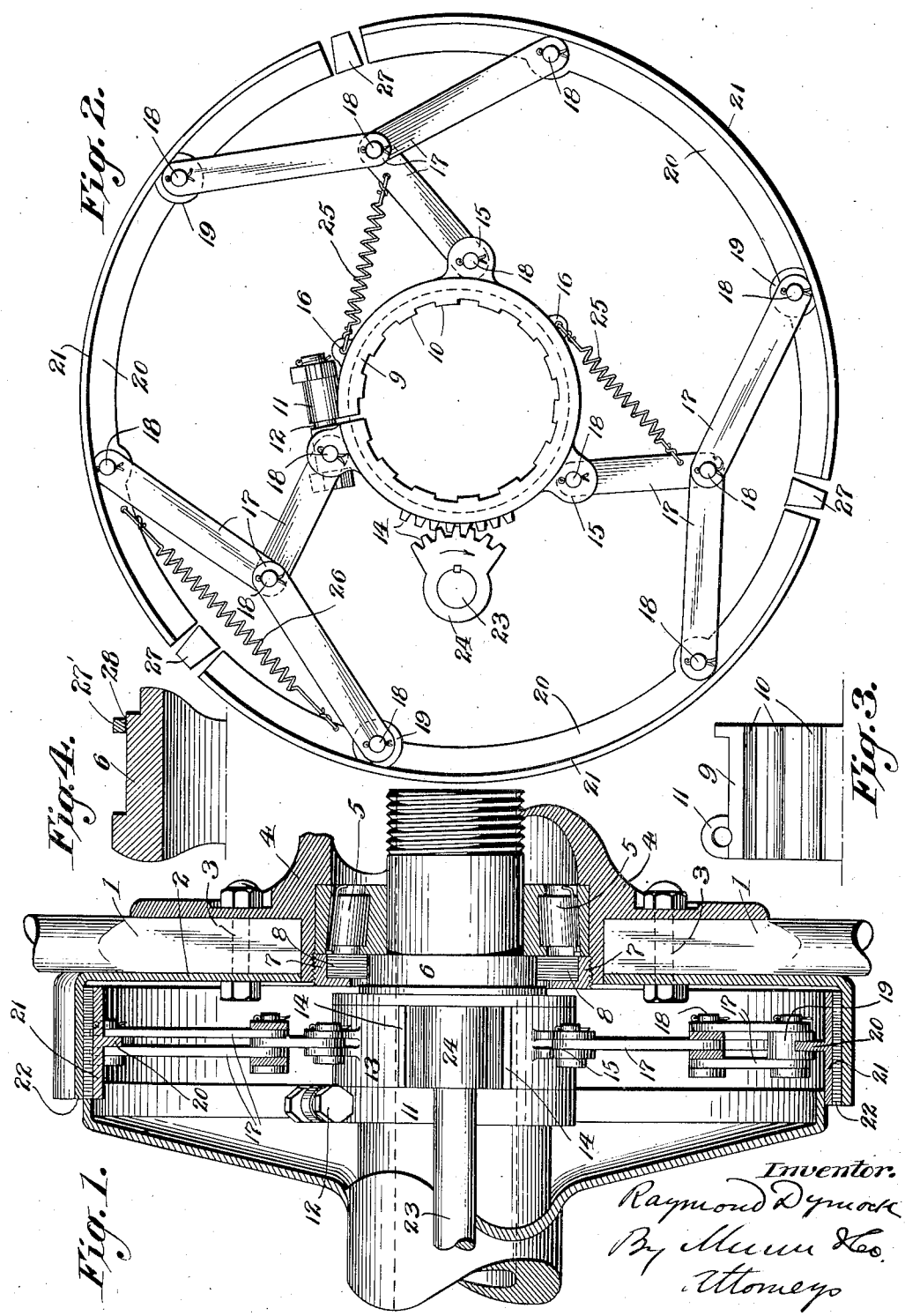

Patented Apr. 14, 1925.

1,533,790

UNITED STATES PATENT OFFICE.

RAYMOND DYMOCK, OF HAMBURG, NEW JERSEY.

INTERNAL BRAKE.

Application filed February 20, 1922. Serial No. 537,952.

*To all whom it may concern:*

Be it known that I, RAYMOND DYMOCK, a citizen of the United States, residing in Hamburg, in the county of Sussex and State of New Jersey, have invented a new and Improved Internal Brake, of which the following is a full, clear, and exact description.

This invention relates to the improvements in internal brakes, and the objects of the improvements are as follows:—

1. To provide an internal brake that can easily and quickly be applied in place of the present internal brakes or to new machines or vehicles where internal brakes are employed.

2. An internal brake which upon application, acts on the entire surface of the brake drum equally, giving maximum bearing power with minimum operating power.

3. A brake which gives longer life to the brake lining by preventing wear in one spot.

4. A brake that needs no adjustment.

5. One which affords immediate tightening or releasing on the whole drum.

6. One which operates equally as well whether the wheel to which it is applied is turning backward or forward.

I attain these objects by the mechanism illustrated in the accompanying drawings, in which:—

Fig. 1 is a view mainly in cross section illustrating my improved internal brake as applied to the rear wheels of an automobile.

Fig. 2 shows the brake in elevation.

Fig. 3 is a detailed view of the bearing used when replacing present internal brakes.

Fig. 4 is a detailed view of the manner of forming a bearing on new machines or vehicles.

Referring in detail to the drawings; in Fig. 1, 1 represents the spokes of a wheel which are attached to brake drum 2 by bolts 3, which are also utilized to secure the casting 4 in place. This casting is free to run on bearings 5 held in place on housing 6 by bearing retainer 7 and felt washer 8.

In replacing present internal brakes a split bearing 9, Figs. 1, 2 and 3, is fitted to housing 6 by lugs 10 and attached to said housing by retaining band 11 and bolt 12, after gear 13 with teeth 14 and lugs 15 and 16, cast or otherwise attached, is positioned on said bearing.

On new machines or vehicles housing 6, Fig. 4, can be made as shown with threads 28, and gear 13 can be attached and held in position by lock nut 27.

Pinion gear 24 is keyed, or otherwise secured, on brake shaft 23 which is operated by the driver in the direction indicated when applying the brake, and the teeth of pinion gear 24 mesh with teeth 14 of gear 13, moving said gear and thereby lugs 15 thereto attached.

A plurality of rods 17 are employed for connecting the bearing member 9 with the flanges 20 of the various sections of the brake band 21. These rods are arranged in sets or groups, there being three rods in each set. The rods of each set are provided at adjacent ends with a common pivot and the opposite ends of two of said rods are pivotally connected to different sections of the brake band 21, while the other end of the third rod is pivotally connected to the bearing member 9, the latter rod being normally disposed at an angle to a radius of said brake band. The pivot connections for the various rods are indicated by the numeral 18. By thus arranging the rods, it will be obvious that when the bearing member is rotated in a counterclockwise direction, as viewed in Figure 2, this movement of the bearing will decrease the angular relation of the rod 17 connected thereto with respect to said radius and in so doing will move the other rods 17 of the set to increase the effective circumference of the brake band and cause the sections 21 thereof to engage the brake lining 22 and force the same into contact with the flange 2. By employing a plurality of sets of rods, it will be apparent that the various sections of the brake band will be moved to cause an equal pressure throughout the circumference of said band against the lining 22. The rods 17 are of sufficient length to eliminate the making of adjustments as the lining 22 becomes worn.

Immediate release is procured by springs 25 and 26 which upon release of operating pressure brings brake band 21 back to the normal position and brake lining away from band 2.

Studs 27 secured to housing 6, prevent brake band 21 from moving in the direction of the rotation of the wheel, therefore making a positive brake in either direction.

Various slight changes and alterations might be made in the general form described without departing from my invention, and hence I do not limit myself to the precise details set forth, but consider myself at liberty to make such slight changes and alterations as fairly fall within the spirit and scope of the appended claims.

Having thus described my invention, what I claim as new and desire by Letters Patent is as follows:—

1. In a brake mechanism for vehicles, the combination with a wheel and a brake drum secured to the wheel, of a toothed member mounted to turn in the drum, a brake shaft, a toothed segment mounted on the brake shaft and meshing with the toothed member, a sectional brake band having its ends spaced apart, a spring connecting two of the brake band sections, fixed studs in the space between the brake band sections, a plurality of sets of arms, each set consisting of three arms, two of which are pivoted together and each to a brake band section and the third arm pivoted to the first two arms and to the toothed member, and springs secured to the third arm of two of the sets and to the toothed member.

2. In a braking mechanism for vehicles, a brake drum mounted upon a wheel, a toothed member mounted to turn in the drum, a brake shaft, a toothed segment on the brake shaft and meshing with the toothed member, sectional brake bands having their ends spaced apart, fixed studs in the spaces between the ends of the brake band sections, a plurality of sets of arms, each set consisting of three arms, pivoted together, two of the arms being pivoted to the adjacent sections of the brake band and the third arm pivoted to the toothed member, and springs for returning the brake band sections to normal position.

3. In a brake mechanism for vehicles, a brake drum mounted for rotary movement, a toothed member mounted to turn in the drum, a brake shaft, a toothed segment on the shaft and meshing with the toothed member, a sectional brake band, a plurality of sets of arms, each set consisting of three arms pivoted together, two of the arms being pivoted to the adjacent sections of the brake band and the third arm to the toothed member, a spring secured to two adjacent sections of the brake band, and springs secured to the toothed member and to the third arm of two of the sets of arms.

4. In a brake mechanism for vehicles, a sectional brake band, a bearing member having a rotary movement relative to said band, a plurality of sets of connecting elements between said band and member, the elements of each set having a common pivot and also having pivot connections with said band and member, means for rotating said member to actuate said connecting elements, whereby outward radial movement of the sections of said band is effected, resilient means joining said member with certain of said connecting elements for restoring said sections of the band to normal, and additional resilient means connecting certain of the sections of the band for aiding in the restoration of said sections to normal.

RAYMOND DYMOCK.